United States Patent
Cao et al.

(10) Patent No.: US 11,506,680 B2
(45) Date of Patent: Nov. 22, 2022

(54) SPEED SENSOR, DEVICE FOR MEASURING SPEED AND METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhonglin Cao, Beijing (CN); Yuanjie Xu, Beijing (CN); Jing He, Beijing (CN); Huanchun Wang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 528 days.

(21) Appl. No.: 16/714,445

(22) Filed: Dec. 13, 2019

(65) Prior Publication Data

US 2020/0264208 A1 Aug. 20, 2020

(30) Foreign Application Priority Data

Feb. 19, 2019 (CN) .......................... 201910122456.8

(51) Int. Cl.
*G01P 3/38* (2006.01)
*G01P 3/50* (2006.01)
(Continued)

(52) U.S. Cl.
CPC .................. *G01P 3/50* (2013.01); *G01P 3/36* (2013.01); *G02F 1/133526* (2013.01)

(58) Field of Classification Search
CPC combination set(s) only.
See application file for complete search history.

(56) References Cited

U.S. PATENT DOCUMENTS 5,166,723 A 11/1992 Yoshida et al.
7,215,480 B2 * 5/2007 Ito .......................... G02F 1/167
359/666

(Continued)

FOREIGN PATENT DOCUMENTS

CN 36105821 A 2/1988
CN 101010611 A 8/2007
(Continued)

OTHER PUBLICATIONS

First Office Action for Chinese Application No. 201910122456.8, dated Sep. 14, 2020, 9 Pages.
(Continued)

*Primary Examiner* — Brandi N Hopkins
(74) *Attorney, Agent, or Firm* — Brooks Kushman P.C.

(57) ABSTRACT

A speed sensor, a device for measuring a speed, and a method for measuring a speed are provided. The speed sensor includes: an imaging device; a liquid crystal lens on a side of the imaging device; and a controller configured to: apply different voltages to the liquid crystal lens, obtain, via the imaging device, images of a reference object formed through the liquid crystal lens under the different voltages, control, based on information of the images, the liquid crystal lens to realize focus for multiple times for the reference object, obtain a voltage that is correspondingly applied to the liquid crystal lens when each of the multiple times of focus is realized, and calculate a speed based on the voltages.

20 Claims, 3 Drawing Sheets

(51) Int. Cl.
*G01P 3/36* (2006.01)
*G02F 1/1335* (2006.01)

(56) References Cited

U.S. PATENT DOCUMENTS

| | | | | |
|---|---|---|---|---|
| 7,911,526 B2 * | 3/2011 | Kageyama | ............... | G02B 7/38 |
| | | | | 348/349 |
| 2006/0171696 A1 * | 8/2006 | Murata | ................ | G02B 26/005 |
| | | | | 396/72 |
| 2007/0279365 A1 | 12/2007 | Kageyama | | |
| 2007/0279539 A1 * | 12/2007 | Suzuki | ..................... | G02F 1/29 |
| | | | | 349/1 |

FOREIGN PATENT DOCUMENTS

| | | | |
|---|---|---|---|
| CN | 103744237 A | 4/2014 | |
| CN | 105158496 A | 12/2015 | |
| CN | 105301279 A | 2/2016 | |
| CN | 105891813 A | 8/2016 | |
| DE | 102006012325 A1 | 9/2007 | |

OTHER PUBLICATIONS

Third Office Action for Chinese Application No. 201910122456.8, dated Sep. 26, 2021, 8 Pages.

* cited by examiner

SPEED SENSOR, DEVICE FOR MEASURING SPEED AND METHOD THEREOF

CROSS-REFERENCE TO RELATED APPLICATION

This application claims a priority to Chinese Patent Application No. 201910122456.8 filed on Feb. 19, 2019, the disclosure of which is incorporated in its entirety by reference herein.

TECHNICAL FIELD

The present disclosure relates to the field of speed sensor technology, and in particular to a speed sensor, a device for measuring a speed, and a method for measuring a speed.

BACKGROUND

In the related technologies, an acceleration of a measured object is usually obtained by using an acceleration sensor that is based on Newton's second law. Generally, the acceleration sensor based on Newton's second law is only used to obtain the acceleration of the measured object. Therefore, the acceleration sensor based on Newton's second law has the single function and the single application scene, which greatly degrades the user experience. Moreover, the acceleration sensor based on Newton's second law has a relatively high manufacturing cost, and its detection accuracy of the acceleration of the measured object is not high enough.

SUMMARY

In a first aspect, embodiments of the present disclosure provide a speed sensor, which includes: an imaging device; a liquid crystal lens on a side of the imaging device; and a controller, configured to: apply different voltages to the liquid crystal lens, obtain, via the imaging device, images of a reference object formed through the liquid crystal lens under the different voltages, control, based on information of the images, the liquid crystal lens to realize focus for multiple times for the reference object, obtain a voltage that is correspondingly applied to the liquid crystal lens when each of the multiple times of focus is realized, and calculate a speed based on the voltages.

In addition, the speed sensor according to the above embodiments of the present disclosure may have the following additional technical features.

In some embodiments of the present disclosure, controlling, based on the information of the images, the liquid crystal lens to realize focus for the multiple times for the reference object includes: controlling, based on the information of the images, the liquid crystal lens to realize first focus and second focus for the reference object; and obtaining the voltage that is correspondingly applied to the liquid crystal lens when each of the multiple times of focus is realized includes: obtaining a first voltage that is applied to the liquid crystal lens when the first focus is realized and a second voltage that is applied to the liquid crystal lens when the second focus is realized.

In some embodiments of the present disclosure, the liquid crystal lens is configured to: perform the first focus and the second focus for the reference object at a start time of a first period and an end time of the first period respectively.

In some embodiments of the present disclosure, the controller is configured to: obtain the first voltage and the second voltage of the liquid crystal lens respectively corresponding to the first focus and the second focus; and calculate the speed of the first period based on the first voltage and the second voltage.

In some embodiments of the present disclosure, calculating the speed of the first period based on the first voltage and the second voltage includes: obtaining a first focal length corresponding to the first focus and a second focal length corresponding to the second focus based on the first voltage and the second voltage; calculating a first object distance corresponding to the first focus and a second object distance corresponding to the second focus based on the first focal length and the second focal length; and calculating the speed based on the first object distance, the second object distance, and the first period.

In some embodiments of the present disclosure, the controller is configured to: determine the first focal length and the second focal length based on a mapping relation, between focal lengths and voltages, of the liquid crystal lens; and calculate the first object distance and the second object distance respectively corresponding to the first focal length and the second focal length based on the following formula:

$$1/u + 1/d = 1/f,$$

where u is an object distance, d is an image distance, f is a focal length, and the image distance is a distance between an image plane of the imaging device and the liquid crystal lens.

In some embodiments of the present disclosure, controlling, based on the information of the images, the liquid crystal lens to realize focus for the multiple times for the reference object further includes: controlling, based on the information of the images, the liquid crystal lens to realize third focus and fourth focus for the reference object; obtaining the voltage that is correspondingly applied to the liquid crystal lens when each of the multiple times of focus is realized further includes: obtaining a third voltage that is applied to the liquid crystal lens when the third focus is realized and a fourth voltage that is applied to the liquid crystal lens when the fourth focus is realized; and the liquid crystal lens is further configured to: perform the third focus and the fourth focus for the reference object at a start time of a second period and an end time of the second period respectively.

In some embodiments of the present disclosure, the controller is configured to: obtain the first voltage and the second voltage of the liquid crystal lens respectively corresponding to the first focus and the second focus, and obtain the third voltage and the fourth voltage of the liquid crystal lens respectively corresponding to the third focus and the fourth focus; calculate a first average speed of the first period based on the first voltage and the second voltage, and calculate a second average speed of the second period based on the third voltage and the fourth voltage; and calculate an acceleration based on the first average speed and the second average speed.

In some embodiments of the present disclosure, calculating the first average speed of the first period based on the first voltage and the second voltage, and calculating the second average speed of the second period based on the third voltage and the fourth voltage includes: obtaining a first focal length corresponding to the first focus and a second focal length corresponding to the second focus based on the first voltage and the second voltage, and obtaining a third focal length corresponding to the third focus and a fourth focal length corresponding to the fourth focus based on the third voltage and the fourth voltage; calculating a first object distance corresponding to the first focus and a second object distance corresponding to the second focus based on the first focal length and the second focal length, and calculating a third object distance corresponding to the third focus and a fourth object distance corresponding to the fourth focus based on the third focal length and the fourth focal length; and calculating the first average speed based on the first object distance, the second object distance, and the first period, and calculating the second average speed based on the third object distance, the fourth object distance, and the second period.

In some embodiments of the present disclosure, the controller is configured to: determine the first focal length to the fourth focal length based on a mapping relation, between focal lengths and voltages, of the liquid crystal lens; and calculate the first object distance to the fourth object distance respectively corresponding to the first focal length to the fourth focal length based on the following formula:

$$1/u + 1/d = 1/f,$$

where u is an object distance, d is an image distance, f is a focal length, and the image distance is a distance between an image plane of the imaging device and the liquid crystal lens.

In some embodiments of the present disclosure, the speed sensor further includes a memory, configured to store images of the reference object.

In a second aspect, embodiments of the present disclosure provide a device for measuring a speed, which includes a main body, and multiple speed sensors as described above. The multiple speed sensors are on the main body and are configured to detect speeds of a measured object in multiple directions.

In a third aspect, embodiments of the present disclosure provide a method for measuring a speed, which applied to a speed sensor. The speed sensor includes an imaging device and a liquid crystal lens, and the liquid crystal lens is on a side of the imaging device. The method includes: applying different voltages to the liquid crystal lens, and obtaining, via the imaging device, images of a reference object formed through the liquid crystal lens under the different voltages; controlling, based on information of the images, the liquid crystal lens to realize focus for multiple times for the reference object; and obtaining a voltage that is correspondingly applied to the liquid crystal lens when each of the multiple times of focus is realized, and calculating a speed based on the voltages.

In addition, the method for measuring the speed according to the above embodiments of the present disclosure may have the following additional technical features.

In some embodiments of the present disclosure, controlling, based on the information of the images, the liquid crystal lens to realize focus for the multiple times for the reference object includes: controlling, based on the information of the images, the liquid crystal lens to realize first focus and second focus for the reference object; and obtaining the voltage that is correspondingly applied to the liquid crystal lens when each of the multiple times of focus is realized includes: obtaining a first voltage that is applied to the liquid crystal lens when the first focus is realized and a second voltage that is applied to the liquid crystal lens when the second focus is realized.

In some embodiments of the present disclosure, controlling the liquid crystal lens to realize the first focus and the second focus for the reference object includes: performing the first focus and the second focus for the reference object at a start time of a first period and an end time of the first period respectively.

In some embodiments of the present disclosure, calculating the speed based on the voltages includes: calculating the speed of the first period based on the first voltage and the second voltage; and calculating the speed of the first period based on the first voltage and the second voltage includes: obtaining a first focal length corresponding to the first focus and a second focal length corresponding to the second focus based on the first voltage and the second voltage; calculating a first object distance corresponding to the first focus and a second object distance corresponding to the second focus based on the first focal length and the second focal length; and calculating the speed based on the first object distance, the second object distance, and the first period.

In some embodiments of the present disclosure, the first focal length and the second focal length are determined based on a mapping relation, between focal lengths and voltages, of the liquid crystal lens; and the first object distance and the second object distance respectively corresponding to the first focal length and the second focal length are calculated based on the following formula:

$$1/u + 1/d = 1/f,$$

where u is an object distance, d is an image distance, f is a focal length, and the image distance is a distance between an image plane of the imaging device and the liquid crystal lens.

In some embodiments of the present disclosure, controlling, based on the information of the images, the liquid crystal lens to realize focus for the multiple times for the reference object further includes: controlling, based on the information of the images, the liquid crystal lens to perform third focus and fourth focus for the reference object at a start time of a second period and at an end time of the second period respectively; obtaining the voltage that is correspondingly applied to the liquid crystal lens when each of the multiple times of focus is realized further includes: obtaining a third voltage that is applied to the liquid crystal lens when the third focus is realized and a fourth voltage that is applied to the liquid crystal lens when the fourth focus is realized; and calculating the speed based on the voltages includes: calculating a first average speed of the first period based on the first voltage and the second voltage, calculating a second average speed of the second period based on the third voltage and the fourth voltage, and calculating an acceleration based on the first average speed and the second average speed.

In some embodiments of the present disclosure, calculating the first average speed of the first period based on the first voltage and the second voltage, and calculating the second average speed of the second period based on the third voltage and the fourth voltage includes: obtaining a first focal length corresponding to the first focus and a second focal length corresponding to the second focus based on the first voltage and the second voltage, and obtaining a third focal length corresponding to the third focus and a fourth focal length corresponding to the fourth focus based on the third voltage and the fourth voltage; calculating a first object distance corresponding to the first focus and a second object distance corresponding to the second focus based on the first focal length and the second focal length, and calculating a third object distance corresponding to the third focus and a fourth object distance corresponding to the fourth focus based on the third focal length and the fourth focal length; and calculating the first average speed based on the first object distance, the second object distance, and the first period, and calculating the second average speed based on the third object distance, the fourth object distance, and the second period;

the first focal length to the fourth focal length are determined based on a mapping relation, between focal lengths and voltages, of the liquid crystal lens; and the first object distance to the fourth object distance respectively corresponding to the first focal length to the fourth focal length are calculated based on the following formula:

$$1/u+1/d=1/f,$$

where u is an object distance, d is an image distance, f is a focal length, and the image distance is a distance between an image plane of the imaging device and the liquid crystal lens.

In a fourth aspect, embodiments of the present disclosure provide a computer readable storage medium, having a program stored thereon, and when the program is executed by a processor, the method for measuring the speed according to the embodiments of the third aspect of the present disclosure is implemented.

BRIEF DESCRIPTION OF THE DRAWINGS

In order to clarify the technical solutions according to the embodiments of the present disclosure, the drawings used in the description of the embodiments are briefly introduced hereinafter. Apparently, the drawings merely illustrate some embodiments of the present disclosure, and other drawings may be obtained based on these drawings by those skilled in the art without any creative efforts.

DETAILED DESCRIPTION

Hereinafter, embodiments of the present disclosure are described in detail. Examples of the embodiments are shown in the accompanying drawings, where the same or similar reference signs represent the same or similar elements or elements having the same or similar functions. The embodiments described hereinafter with reference to the drawings are exemplary, which are intended to explain the present disclosure and should not be construed as limitation to the present disclosure.

A speed sensor, a device for measuring a speed, a method for measuring a speed, and a computer readable storage medium according to embodiments of the present disclosure are described hereinafter with reference to the drawings.

Figure 1:
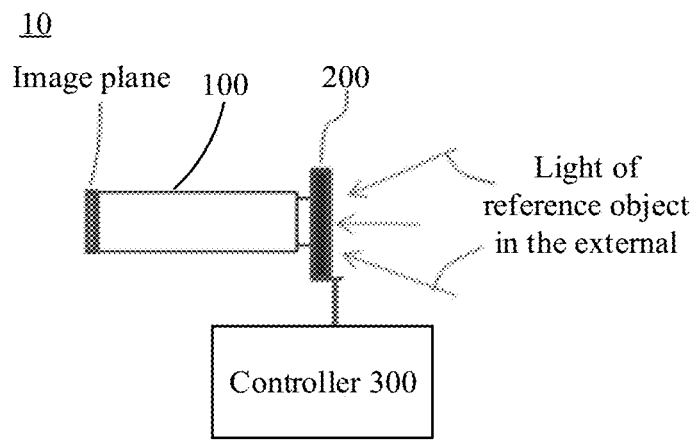
FIG. 1 is a schematic structural diagram of a speed sensor according to some embodiments of the present disclosure.

FIG. 1 is a schematic structural diagram of a speed sensor according to some embodiments of the present disclosure. As shown in FIG. 1, the speed sensor 10 according to the embodiments of the present disclosure may include an imaging device 100, a liquid crystal lens 200, and a controller 300.

The liquid crystal lens 200 is arranged on a side of the imaging device 100. The controller 300 may be configured to: apply different voltages to the liquid crystal lens, obtain, via the imaging device, images of a reference object formed through the liquid crystal lens under the different voltages, control, based on information of the images, the liquid crystal lens to realize focus for multiple times for the reference object, obtain a voltage that is correspondingly applied to the liquid crystal lens when each of the multiple times of focus is realized, and calculate a speed based on the voltages.

In some embodiments, controlling, based on the information of the images, the liquid crystal lens to realize focus for the multiple times for the reference object includes: controlling, based on the information of the images, the liquid crystal lens to realize first focus and second focus for the reference object; and obtaining the voltage that is correspondingly applied to the liquid crystal lens when each of the multiple times of focus is realized includes: obtaining a first voltage that is applied to the liquid crystal lens when the first focus is realized and a second voltage that is applied to the liquid crystal lens when the second focus is realized.

In some embodiments, the liquid crystal lens is configured to: perform the first focus and the second focus for the reference object at a start time of a first period and an end time of the first period respectively.

In some embodiments, the controller is configured to: obtain the first voltage and the second voltage of the liquid crystal lens respectively corresponding to the first focus and the second focus; and calculate the speed of the first period based on the first voltage and the second voltage.

In some embodiments, calculating the speed of the first period based on the first voltage and the second voltage includes: obtaining a first focal length corresponding to the first focus and a second focal length corresponding to the second focus based on the first voltage and the second voltage; calculating a first object distance corresponding to the first focus and a second object distance corresponding to the second focus based on the first focal length and the second focal length; and calculating the speed based on the first object distance, the second object distance, and the first period.

In some embodiments, the controller is configured to: determine the first focal length and the second focal length based on a mapping relation, between focal lengths and voltages, of the liquid crystal lens.

In some embodiments, the controller is configured to: calculate the first object distance and the second object distance respectively corresponding to the first focal length and the second focal length based on the following formula:

$$1/u+1/d=1/f,$$

where u is an object distance, d is an image distance, f is a focal length, and the image distance is a distance between an image plane of the imaging device and the liquid crystal lens.

The speed sensor according to the embodiments of the present disclosure may further be adopted to calculate an acceleration.

The technical solutions of the present disclosure are described in detail hereinafter, by taking a case where the speed sensor is adopted to calculate an acceleration as an example. For the solutions in which the speed sensor is adopted to calculate the speed, reference can be made to the calculations of a first average speed or a second average speed in the following, which is not repeated herein.

In some embodiments, the controller 300 is configured to: control voltages applied to the liquid crystal lens, obtain, via the imaging device, images of a reference object under different voltages, perform digital processing on the images of the reference object under the different voltages to generate digital information, determine, based on the digital information, that first focus to fourth focus are performed for the reference object by the liquid crystal lens, obtain a first focus voltage to a fourth focus voltage based on the first focus to the fourth focus, and calculate an acceleration based on the first focus voltage to the fourth focus voltage.

According to some embodiments of the present disclosure, the liquid crystal lens 200 is configured to perform the first focus and the second focus for the reference object at a start time of a first period and an end time of the first period respectively, and perform the third focus and the fourth focus for the reference object at a start time of a second period and an end time of the second period respectively.

In some embodiments, the controller 300 is configured to obtain the first focus voltage and the second focus voltage of the liquid crystal lens 200 respectively corresponding to the first focus and the second focus, and obtain the third focus voltage and the fourth focus voltage of the liquid crystal lens 200 respectively corresponding to the third focus and the fourth focus; calculate a first average speed of the first period based on the first focus voltage and the second focus voltage, and calculate a second average speed of the second period based on the third focus voltage and the fourth focus voltage; and calculate the acceleration based on the first average speed and the second average speed.

Figure 2:
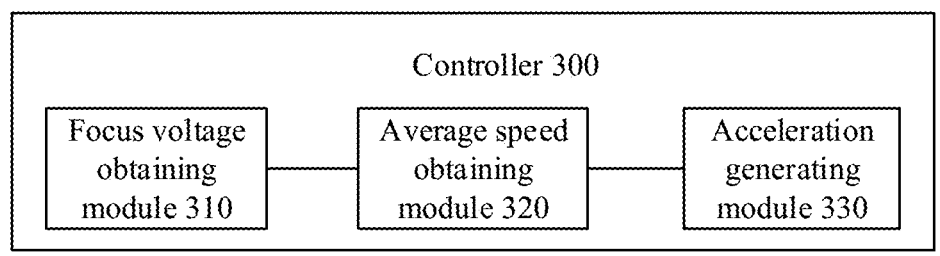
FIG. 2 is a block diagram of a controller according to some embodiments of the present disclosure.

According to some embodiments of the present disclosure, as shown in FIG. 2, the controller 300 may include a focus voltage obtaining module 310, an average speed obtaining module 320, and an acceleration generating module 330. The focus voltage obtaining module 310 is configured to obtain the first focus voltage and the second focus voltage of the liquid crystal lens 200 respectively corresponding to the first focus and the second focus, and obtain the third focus voltage and the fourth focus voltage of the liquid crystal lens 200 respectively corresponding to the third focus and the fourth focus. The average speed obtaining module 320 is configured to calculate the first average speed of the first period based on the first focus voltage and the second focus voltage, and calculate the second average speed of the second period based on the third focus voltage and the fourth focus voltage. The acceleration generating module 330 is configured to calculate the acceleration based on the first average speed and the second average speed.

Specifically, the speed sensor 10 according to the embodiments of the present disclosure may be provided on an object to be measured. For example, the speed sensor 10 may be provided on a front end of the object to be measured, so that the speed sensor 10 and the object to be measured can move synchronously. During the movement of the object, a reference object (which may be a fixed reference object in the outside, such as a tree, a building, etc.), which is right in front of the object to be measured, may be selected, and focus may be performed for the reference object through the liquid crystal lens 200 in the speed sensor 10. In this case, by obtaining the change amount of the object distance in a case that focus is performed for the reference object in each period, the distance that the measured object moves relative to the reference object in each period can be obtained. In this way, the average speed of the measured object in each period can be obtained, thereby obtaining the acceleration of the measured object.

Figure 3:
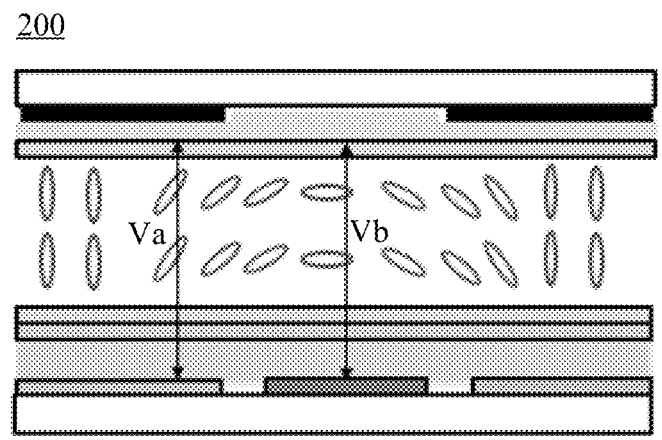
FIG. 3 is a cross-sectional view of a structure of a liquid crystal lens according to some embodiments of the present disclosure.

It should be noted that, as shown in FIG. 3, the liquid crystal lens 200 is generally formed by two layers of driving electrode plates (i.e., an upper driving electrode plate and a lower driving electrode plate) and a liquid crystal layer, and the liquid crystal layer is sandwiched between the upper driving electrode plate and the lower driving electrode plate. When the liquid crystal lens 200 is in an operating state, different voltages may be applied between different sub-electrodes in the upper driving electrode plate and the lower driving electrode plate, such as Va and Vb, where Va≠Vb. By changing the voltages between the different sub-electrodes in the upper drive electrode plate and the lower drive electrode plate, the distribution of the intensity of the electric field in the liquid crystal cell in the horizontal direction is adjusted, and then the arrangement of the twist angles of the liquid crystal molecules in different regions is controlled, so as to form a distribution in which there exists optical path differences, to realize focal length variation. In addition, the liquid crystal lens 200 realizes focus for the reference object with an auto focus method (for example, a contrast detection auto focus method). Specifically, in a case that the contrast detection auto focus method is adopted, images of a reference object under different voltages may be obtained via the imaging device, that is, an image is captured for each focal point, and digital processing is performed on the captured images to generate digital information (the digital information may be a number matrix). A calculation chip unit in the controller 300 may calculate contrast amounts of the multiple images, and determine the maximum value of the multiple contrast amounts through comparison, and the focal point is set to be a focal point that is corresponding to a contrast amount having the maximum value. In this way, it can be determined that focus for the reference object is performed by the liquid crystal lens 200 for a time. By repeating the above steps, the first focus to the fourth focus for the reference object may be respectively realized by the liquid crystal lens 200.

It should be noted that in the embodiments of the present disclosure, for the multiple times of focus (for example, the first focus to the fourth focus) realized for the reference object, each of the multiple focus refers to the face that an adjusted focal length of the liquid crystal lens enables an image of the reference object formed through the liquid crystal lens to be clear. In specific applications, for example, in a case that the contrast detection auto focus method is adopted, when the contrast amount takes the maximum value, it can be considered that the current focal length enables the image of the reference object formed through the liquid crystal lens to be clear, that is, focus is realized for the reference object by the liquid crystal lens for a time.

Each time the focus is completed, the corresponding voltage value of the liquid crystal lens 200 at that moment may be obtained (that is, the voltage applied to the liquid crystal lens 200 when the focus is realized is obtained), namely, the focus voltage V of the liquid crystal lens 200. The focus voltage V may be a combination of voltages between different sub-electrodes in the upper driving electrode plate and the lower driving electrode plate. For example, it may be an average value of or an array of the voltages between different sub-electrodes in the upper driving electrode plate and the lower driving electrode plate.

That is, when performing focus for the reference object by the liquid crystal lens 200, there exists a mapping relation between the focus voltage V and the focal length f of the liquid crystal lens 200.

In addition, when focus for the reference object is performed, there exists a relation among the image distance d, the object distance u, and the focal length f, and the object distance u may be calculated based on the following formula (1):

$$1/u+1/d=1/f, \quad (1)$$

d is the image distance, i.e., the distance between the image of the reference object formed on the image plane in the imaging device 100 and the liquid crystal lens 200. That is, the image distance may be the distance from the image plane of the imaging device to the liquid crystal lens, which is a known value and may be adjusted by a user based on actual needs. u is the object distance, that is, the distance from the reference object to the liquid crystal lens 200. f is the focal length, that is, the distance from the optical center of the liquid crystal lens 200 to the focal point where the light gathers.

That is, when focus for the reference object is performed, there exists a certain mapping relation between the focus voltage V and the focal length f of the liquid crystal lens 200, and there exists a certain relation between the focal length f and the object distance u. Therefore, there exists a certain relation between the focus voltage V of the liquid crystal lens 200 and the object distance u. Based on the change amount of the focus voltage V of the liquid crystal lens 200, the change amount of the object distance u can be obtained.

Therefore, in the embodiments of the present disclosure, the first focus to the fourth focus for the reference object can be performed by the liquid crystal lens 200 at different moments, and the magnitude of the acceleration can be calculated based on the focus voltages corresponding to the first focus to the fourth focus. Specifically, the first focus and the second focus for the reference object can be performed at the start time and the end time of the first period respectively, and the first focus voltage and the second focus of the liquid crystal lens 200 respectively corresponding to the first focus and the second focus can be obtained, so that the change amount of the object distance when focus for the reference object is performed in the first period can be obtained based on the first focus voltage and the second focus voltage. In this way, the distance travelled by the measured object relative to the reference object in the first period is obtained, and then the first average speed of the measured object in the first period is calculated. Similarly, the third focus and the fourth focus for the reference object can be performed at the start time and the end time of the second period respectively, and the third focus voltage and the fourth focus voltage of the liquid crystal lens 200 respectively corresponding to the third focus and the fourth focus can be obtained, so that distance travelled by the measured object relative to the reference object in the second period is obtained. In this way, the second average speed of the measured object in the second period is calculated. The acceleration may be calculated based on the first average speed and the second average speed.

The first period and the second period may be set based on actual situations, and time indicated by each of the first period and the second period needs to be greater than the focus time of the liquid crystal lens 200, to ensure that focus can be realized for one time at each of the start time and the end time of the first period and the start time and the end time of the second period. For example, if the time required by the focus for the liquid crystal lens 200 is less than 200 milliseconds (ms), the times represented by each of the first period and the second period may be 200 ms.

Therefore, during the movement of the measured object, the focus voltages corresponding to the multiple times of focus performed by the liquid crystal lens for the reference object in the moving direction of the measured object at different moments are obtained, so that the speed or the acceleration of the measured object can be calculated more accurately. Moreover, the manufacturing cost is relatively low, the functionality of the speed sensor is improved, range of the application scenarios is wider, and user experience is improved.

Hereinafter, the manner, in which the first average speed of the first period is calculated based on the first focus voltage and the second focus voltage and the second average speed of the second period is calculated based on the third focus voltage and the fourth focus voltage, is described in detail in conjunction with specific embodiments.

Figure 4:
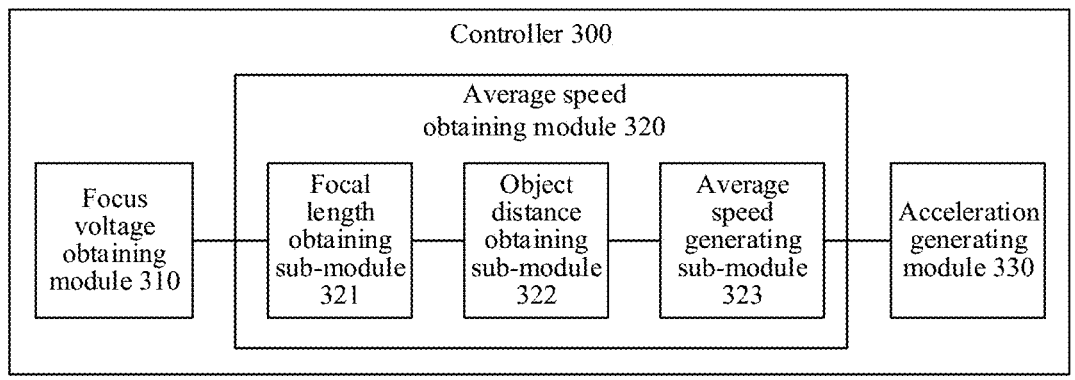
FIG. 4 is a block diagram of a controller according to some other embodiments of the present disclosure.

According to some embodiments of the present disclosure, as shown in FIG. 4, the average speed obtaining module 320 may include a focal length obtaining sub-module 321, an object distance obtaining sub-module 322, and an average speed generating sub-module 323.

The focal length obtaining sub-module 321 is configured to obtain the first focal length corresponding to the first focus and the second focal length corresponding to the second focus based on the first focus voltage and the second focus voltage, and obtain the third focal length corresponding to the third focus and the fourth focal length corresponding to the fourth focus based on the third focus voltage and the fourth focus voltage. The object distance obtaining sub-module 322 is configured to calculate the first object distance and the second object distance respectively corresponding to the first focus and the second focus based on the first focal length and the second focal length, and calculate the third object distance and the fourth object distance respectively corresponding to the third focus and the fourth focus based on the third focal length and the fourth focal length. The average speed generating sub-module 323 is configured to calculate the first average speed based on the first object distance, the second object distance, and the first period, and calculate the second average speed based on the third object distance, the fourth object distance and the second period.

It should be noted that before the speed sensor 10 is put into use, for example, before the speed sensor leaves the factory, a test in which focus is performed for the identical object for multiple times can be carried out to obtain a mapping relation between focal length f and focus voltage V of the liquid crystal lens 200.

Specifically, when focus for the identical object is performed, the image distance d is a fixed value, and the image distance d, the object distance u, and the focal length f satisfy the above formula (1).

When the magnitude of the object distance u changes, the magnitude of the focal length f also changes accordingly. Accordingly, the magnitude of the focus voltage V of the liquid crystal lens 200 also changes. In this case, the object distance u may be substituted into the formula (1) to calculate the corresponding focal length f. In addition, the corresponding focus voltage V of the liquid crystal lens 200 can be detected. In this way, a collection of the focal length f and the corresponding focus voltage V of the liquid crystal lens 200 is obtained.

Therefore, by changing the magnitude of the object distance u for multiple times, multiple collections of focal lengths f and the corresponding focus voltages V of the liquid crystal lens 200 can be obtained, so as to establish a mapping relation between focal lengths f and focus voltages V of the liquid crystal lens 200, and the mapping relation is pre-stored in the speed sensor 10 (for example, stored in a memory of the speed sensor 10), which can be called when determining a focal length.

Therefore, the focal length obtaining sub-module 321 can determine the focal lengths based on the mapping relation, between focal lengths and focus voltages, of the liquid crystal lens 200. That is, the focal length obtaining sub-module 321 calls the mapping relation between focal lengths and focus voltages when the first focus voltage $V_1$ and the second focus voltage $V_2$ are obtained, to obtain the first focal length $f_1$ corresponding to the first focus and the second focal length $f_2$ corresponding to the second focus; and calls the mapping relation between focal lengths and focus voltages when the third focus voltage $V_3$ and the fourth focus voltage $V_4$ are obtained, to obtain the third focal length $f_3$ corresponding to the third focus and the fourth focal length $f_4$ corresponding to the fourth focus.

Furthermore, the image distance d, the object distance u, and the focal length f can satisfy the formula (1), and the image distance d is a fixed value which is known, therefore, after the first focal length $f_1$ corresponding to the first focus and the second focal length $f_2$ corresponding to the second focus are determined by the focal length obtaining sub-module 321, the first object distance $u_1$ and the second object distance $u_2$ respectively corresponding to the first focus and the second focus may be calculated by the object distance obtaining sub-module 322 based on formula (1), that is, $$1/u_1 + 1/d = 1/f_1,$$

$$1/u_2 + 1/d = 1/f_2, \qquad (2)$$

The first object distance $u_1$ and the second object distance $u_2$ can be obtained by simplifying the formula group (2). Similarly, after the third focal length $f_3$ corresponding to the third focus and the fourth focal length $f_4$ corresponding to the fourth focus are determined by the focal length obtaining sub-module 321, the third object distance $u_3$ and the fourth object distance $u_4$ respectively corresponding to the third focus and the fourth focus may be calculated by the object distance obtaining sub-module 322 based on formula (1).

It can be understood that the object distance is the distance from the reference object to the optical center of the liquid crystal lens 200, i.e., the distance between the speed sensor 10 and the reference object. Therefore, during the movement of the measured object, based on the focal length, which is corresponding to the focus performed for the reference object at the start time of each period, a first distance between the speed sensor 10 and the reference object at the start time of the each period is obtained; and based on the focal length, which is corresponding to the focus performed for the reference object at the end time of each period, a second distance between the speed sensor 10 and the reference object at the end time of the each period is obtained. Based on the first distance and the second distance of the each period, the distance travelled by the measured object relative to the reference object in the each period can be calculated. Through dividing the calculated distance, which is travelled by the measured object relative to the reference object, by the time corresponding to the each period, the average speed of the measured object during the each period is obtained.

Figure 5:
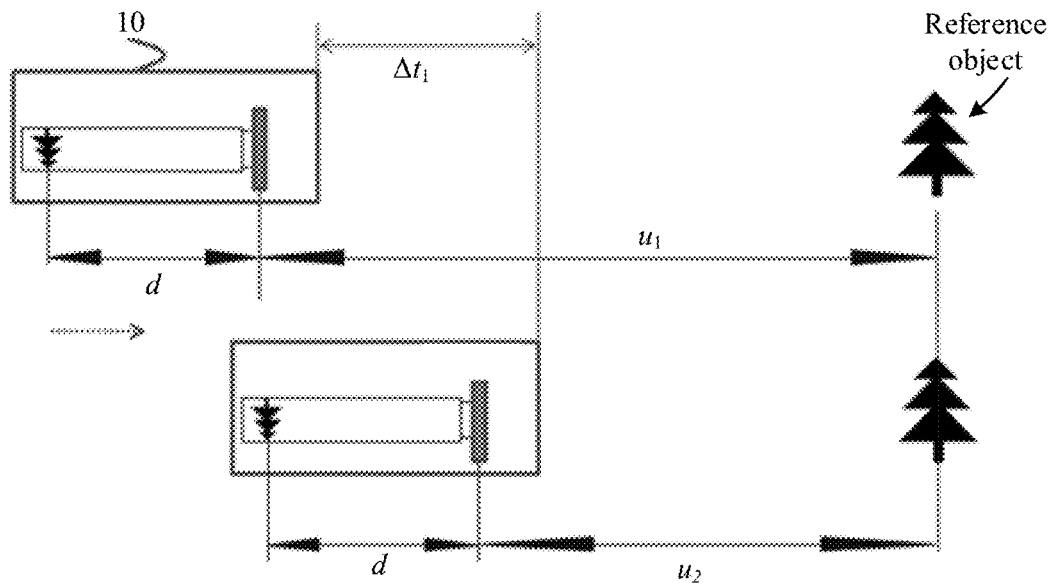
FIG. 5 is a schematic diagram of a method for measuring a speed of a measured object within a certain period according to some embodiments of the present disclosure.

For example, taking a liquid crystal lens 200 with a cell thickness of 15 micrometers (μm) as an example, the focus speed of the liquid crystal lens 200 is less than 200 ms. For the first period, as shown in FIG. 5, it is assumed that the time interval between the start time and the end time of the first period is $\Delta t_1$ (for example, it may be 200 ms). At the start time of the first period, when the first focus is performed for the reference object by the liquid crystal lens 200 in the speed sensor 10, the first focal length $f_1$ corresponding to the first focus may be obtained based on the first focus voltage V1, and the first focal length $f_1$ may be substituted into formula (1) to calculate the corresponding first object distance $u_1$. At the end time of the first period, when the second focus is performed for the reference object by the liquid crystal lens 200 in the speed sensor 10, the second focal length $f_2$ corresponding to the second focus may be obtained based on the second focus voltage V2, and the second focal length $f_2$ may be substituted into formula (1) to calculate the corresponding second object distance $u_2$. Based on the first object distance $u_1$ and the second object distance $u_2$, the distance $x_1$ travelled by the measured object relative to the reference object in the first period may be calculated, where $x_1 = u_1 - u_2$. Through dividing the calculated distance $x_1$ travelled by the measured object relative to the reference object by the time $\Delta t_1$ corresponding to the first period, the first average speed $v_1$ of the measured object in the period may be obtained, i.e., $v_1 = x_1/\Delta t_1$.

Similarly, for the second period, it is assumed that the time interval between the start time and the end time of the second period is $\Delta t_2$ (for example, it may be 200 ms). At the start time of the second period, when the third focus is performed for the reference object by the liquid crystal lens 200 in the speed sensor 10, the third focal length $f_3$ corresponding to the third focus may be obtained based on the third focus voltage V3, and the third focal length $f_3$ may be substituted into the formula (1) to calculate the corresponding third object distance $u_3$. At the end time of the second period, when the fourth focus is performed for the reference object by the liquid crystal lens 200 in the speed sensor 10, the fourth focal length $f_4$ corresponding to the fourth focus may be obtained based on the fourth focus voltage V4, and the fourth focal length $f_4$ may be substituted into formula (1) to calculate the corresponding fourth object distance $u_4$. Based on the third object distance $u_3$ and the fourth object distance $u_4$, the distance $x_2$ travelled by the measured object relative to the reference object in the second period may be calculated, where $x_2 = u_3 - u_4$. Through dividing the calculated distance $x_2$ travelled by the measured object relative to the reference object in the second period by the time $\Delta t_2$ corresponding to the second period, the second average speed $v_2$ of the measured object in the period may be obtained, i.e., $v_2 = x_2/\Delta t_2$.

Based on the calculation formula of the acceleration, it can be seen that $a = (v_2 - v_1)/t$, where $v_1$ may be the first average speed, $v_2$ may be the second average speed, t may be the time interval between the start time of the first period and the end time of the second period, the start time of the second period may be before the end time of the first period, and a is the acceleration.

In practical applications, for the convenience of calculation, the end time of the first period may be the start time of the second period, i.e., $t = \Delta t_1 + \Delta t_2$. In this case, $a = (v_2 - v_1)/(\Delta t_1 + \Delta t_2)$. For example, when $\Delta t_1 = \Delta t_2 = 200$ ms, $a = (v_2 - v_1)/400$, thereby, the acceleration of the measured object within 400 ms can be calculated.

It can be understood that in order to accurately calculate the acceleration of the measured object within a preset time, the preset time may be divided into N periods, and an acceleration of the measured object in each period, i.e., $a_1$, $a_2, \ldots, a_N$, may be calculated according to the above method. The average value of the N accelerations may be obtained to obtain the acceleration of the measured object within the preset time, that is, $a=(a_1+a_2++a_N)/N$, where N may be determined based on the focus speed of the liquid crystal lens 200. For example, when the focus speed of the liquid crystal lens 200 is less than 200 ms, the value of N may be 2 if the acceleration of the measured object within 1 s is to be calculated. In this case, $a=(a_1+a_2)/2$, thereby, the acceleration of the measured object in each second can be monitored and displayed, in seconds. In theory, when the focus speed of the liquid crystal lens 200 is infinitely reduced, the instantaneous acceleration value of the measured object at a certain moment can be obtained.

Figure 6:
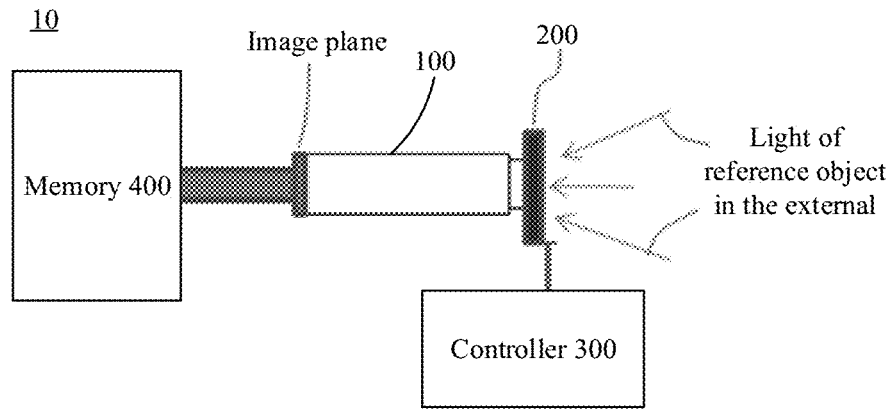
FIG. 6 is a schematic structural diagram of a speed sensor according to some embodiments of the present disclosure.

According to some embodiments of the present disclosure, as shown in FIG. 6, the speed sensor 10 may further include a memory 400. The memory 400 is configured to store images of the reference object.

Specifically, in addition to the functions of detecting the speed and the acceleration of the measured object in a real-time manner, the speed sensor 10 in the embodiments of the present disclosure can also obtain images of the reference object in a real-time manner and store the images in the memory. In this way, the surrounding environment of the measured object can be monitored in a real-time manner to enable the measured object to obtain information of the surrounding environment in a real-time manner. Therefore, the functionality of the speed sensor is greatly improved and the range of the application scenarios is wider. For example, the speed sensor 10 may be applied in a vehicle, and it can serve as a vehicle-mounted recorder to obtain information of the surrounding environment of the vehicle in a real-time manner, in addition to detecting the speed and the acceleration of the vehicle. The speed sensor 10 may also be applied to other scenarios, such as sports and health detection, earthquake, and vibration monitoring.

In summary, according to the speed sensor of the embodiments of the present disclosure, the voltages applied to the liquid crystal lens are controlled by the controller, the images of the reference object under the different voltages are obtained via the imaging device, digital processing is performed on the images of the reference object under the different voltages to generate digital information, it is determined, based on the digital information, that the first focus to the fourth focus are performed for the reference object by the liquid crystal lens, the first focus voltage to the fourth focus voltage are generated based on the first focus to the fourth focus, and the acceleration is calculated based on the first focus voltage to the fourth focus voltage. In this way, during the movement of the measured object, the focus voltages corresponding to the multiple times of focus performed by the liquid crystal lens for the reference object in the moving direction of the measured object at different moments are obtained, so that the acceleration of the measured object can be calculated more accurately. Moreover, the manufacturing cost is relatively low, the functionality of the speed sensor is improved, range of the application scenarios is wider, and user experience is improved.

Figure 7:
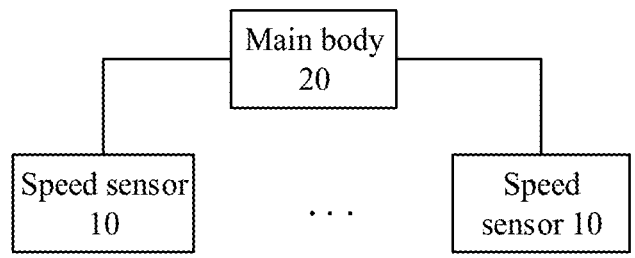
FIG. 7 is a block diagram of a device for measuring a speed according to some embodiments of the present disclosure.

FIG. 7 is a block diagram of a device for measuring a speed according to some embodiments of the present disclosure. As shown in FIG. 7, the device for measuring the speed may include a main body 20 and multiple speed sensors 10 as described above. The multiple speed sensors 10 are arranged on the main body 20. The multiple speed sensors 10 are configured to detect speeds of the measured object in multiple directions.

Figure 8:
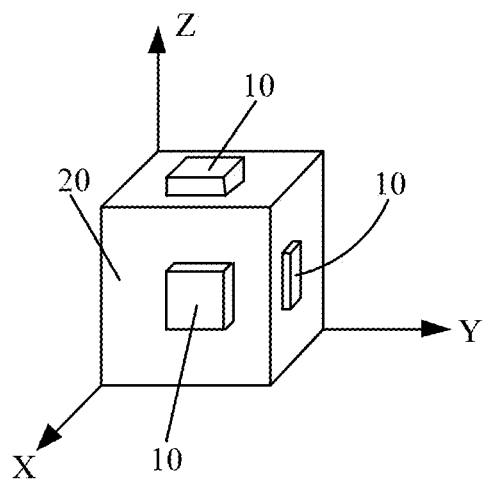
FIG. 8 is a schematic structural diagram of a device for measuring a speed according to some embodiments of the present disclosure.

For example, as shown in FIG. 8, the device for measuring the speed may include the main body 20 and three speed sensors 10 described above. The three speed sensors 10 are arranged on the main body 20 to detect speeds of the measured object in the directions of X-axis, Y-axis, and Z-axis respectively. It should be noted that the number of the speed sensors 10 in the device for measuring the speed in the embodiments of the present disclosure is not limited to three, for example, it may be two or more than three.

Specifically, in actual applications, the device for measuring the speed may be formed by the main body 20 and the speed sensors 10 respectively arranged in the three directions of X-axis, Y-axis, and Z-axis of the main body 20, and the device for measuring the speed is arranged on the measured object to detect the speeds of the object in the directions of X-axis, Y-axis, and Z-axis respectively. For the manner of detecting the speed of the measured object, reference can be made to the above embodiments, which is not described in detail herein to avoid redundancy. In addition, the device for measuring the speed can also detect accelerations of the measured object in the directions of X-axis, Y-axis, and Z-axis respectively. For the manner of detecting the acceleration of the measured object, reference can also be made to the above embodiments, which is not described in detail herein to avoid redundancy.

In some embodiments, the device for measuring the speed may further include a memory for storing data for each of the speed sensors.

According to the device for measuring the speed of the embodiments of the present disclosure, the multiple speed sensors are provided on the main body, and the speeds of the measured object in multiple directions can be more accurately calculated during the movement of the measured object. Moreover, the manufacturing cost is relatively low, the functionality of the speed sensor is improved, range of the application scenarios is wider, and user experience is improved.

A method for measuring a speed is provided according to some embodiments of the present disclosure, which is applied to a speed sensor. The speed sensor includes an imaging device and a liquid crystal lens, and the liquid crystal lens is arranged on a side of the imaging device. The method for measuring the speed includes: applying different voltages to the liquid crystal lens, and obtaining, via the imaging device, images of a reference object formed through the liquid crystal lens under the different voltages; controlling, based on information of the images, the liquid crystal lens to realize focus for multiple times for the reference object; and obtaining a voltage that is correspondingly applied to the liquid crystal lens when each of the multiple times of focus is realized, and calculating a speed based on the voltages.

In some embodiments, controlling, based on the information of the images, the liquid crystal lens to realize focus for the multiple times for the reference object includes: controlling, based on the information of the images, the liquid crystal lens to realize first focus and second focus for the reference object; and obtaining the voltage that is correspondingly applied to the liquid crystal lens when each of the multiple times of focus is realized includes: obtaining a first voltage that is applied to the liquid crystal lens when the first focus is realized and a second voltage that is applied to the liquid crystal lens when the second focus is realized.

In some embodiments, controlling the liquid crystal lens to realize the first focus and the second focus for the reference object includes: performing the first focus and the second focus for the reference object at a start time of a first period and an end time of the first period respectively.

In some embodiments, calculating the speed based on the voltages includes: calculating the speed of the first period based on the first voltage and the second voltage; and calculating the speed of the first period based on the first voltage and the second voltage includes: obtaining a first focal length corresponding to the first focus and a second focal length corresponding to the second focus based on the first voltage and the second voltage; calculating a first object distance corresponding to the first focus and a second object distance corresponding to the second focus based on the first focal length and the second focal length; and calculating the speed based on the first object distance, the second object distance, and the first period.

In some embodiments, the first focal length and the second focal length are determined based on a mapping relation, between focal lengths and voltages, of the liquid crystal lens.

In some embodiments, the first object distance and the second object distance respectively corresponding to the first focal length and the second focal length are calculated based on the following formula:

$$1/u+1/d=1/f,$$

where u is an object distance, d is an image distance, f is a focal length, and the image distance is a distance between an image plane of the imaging device and the liquid crystal lens.

In the method for measuring the speed according to the embodiments of the present disclosure, an acceleration may be further calculated.

The technical solutions of the present disclosure are described in detail hereinafter, by taking a case where the method for measuring the speed is adopted to calculate an acceleration as an example. For the solutions in which the method for measuring the speed is adopted to calculate the speed, reference can be made to the calculations of a first average speed or a second average speed in the following, which is not repeated herein.

Figure 9:
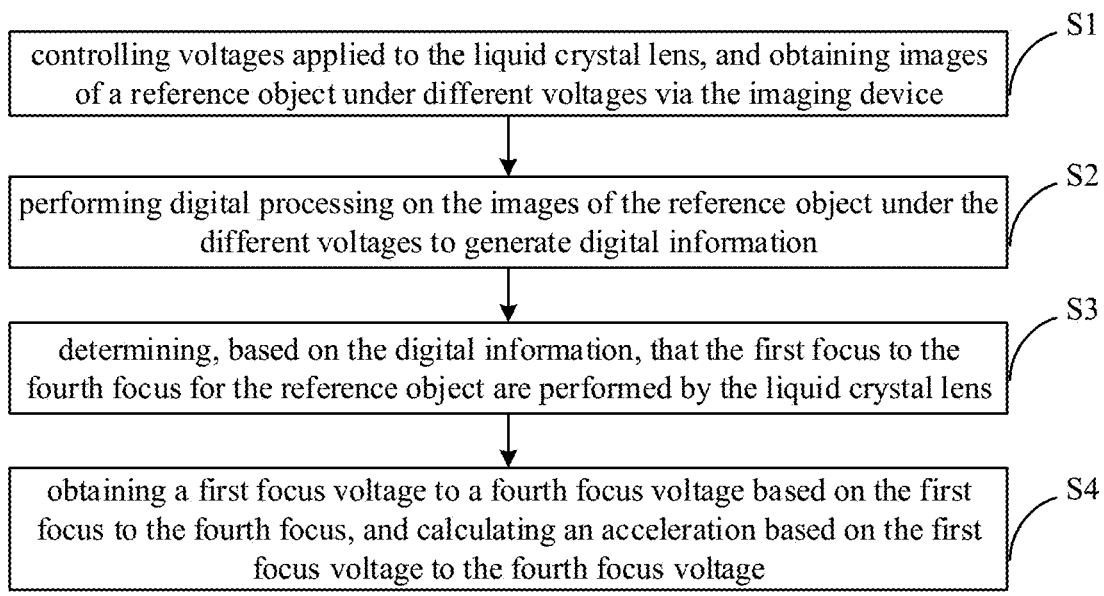
FIG. 9 is a flowchart of a method for measuring a speed according to some embodiments of the present disclosure.

FIG. 9 is a flowchart of a method for measuring a speed according to some embodiments of the present disclosure.

It should be noted that the method according to the embodiments of the present disclosure may be applied to the speed sensor in the above embodiments. As shown in FIG. 1, the speed sensor may include the imaging device and the liquid crystal lens, and the liquid crystal lens may be arranged on a side of the imaging device.

In some embodiments, as shown in FIG. 9, the method for measuring the speed according to the embodiments of the present disclosure may include the following steps.

S1, controlling voltages applied to the liquid crystal lens, and obtaining images of a reference object under different voltages via the imaging device.

S2, performing digital processing on the images of the reference object under the different voltages to generate digital information.

S3, determining, based on the digital information, that the first focus to the fourth focus for the reference object are performed by the liquid crystal lens.

S4, obtaining a first focus voltage to a fourth focus voltage based on the first focus to the fourth focus, and calculating an acceleration based on the first focus voltage to the fourth focus voltage.

According to some embodiments of the present disclosure, performing the first focus to the fourth focus for the reference object includes: performing the first focus and the second focus for the reference object at a start time of a first period and an end time of the first period respectively, and performing the third focus and the fourth focus for the reference object at a start time of a second period and an end time of the second period respectively.

In some embodiments, obtaining the first focus voltage to the fourth focus voltage based on the first focus to the fourth focus, and calculating the acceleration based on the first focus voltage to the fourth focus voltage includes: obtaining the first focus voltage and the second focus voltage of the liquid crystal lens respectively corresponding to the first focus and the second focus, and obtaining the third focus voltage and the fourth focus voltage of the liquid crystal lens respectively corresponding to the third focus and the fourth focus; calculating a first average speed of the first period based on the first focus voltage and the second focus voltage, and calculating a second average speed of the second period based on the third focus voltage and the fourth focus voltage; and calculating the acceleration based on the first average speed and the second average speed.

According to some embodiments of the present disclosure, calculating the first average speed of the first period based on the first focus voltage and the second focus voltage, and calculating the second average speed of the second period based on the third focus voltage and the fourth focus voltage includes: obtaining a first focal length corresponding to the first focus and a second focal length corresponding to the second focus based on the first focus voltage and the second focus voltage, and obtaining a third focal length corresponding to the third focus and a fourth focal length corresponding to the fourth focus based on the third focus voltage and the fourth focus voltage; calculating a first object distance corresponding to the first focus and a second object distance corresponding to the second focus based on the first focal length and the second focal length, and calculating a third object distance corresponding to the third focus and a fourth object distance corresponding to the fourth focus based on the third focal length and the fourth focal length; and calculating the first average speed based on the first object distance, the second object distance, and the first period, and calculating the second average speed based on the third object distance, the fourth object distance, and the second period.

According to some embodiments of the present disclosure, the focal lengths may be determined based on a mapping relation, between focal lengths and voltages, of the liquid crystal lens.

In some embodiments of the present disclosure, the object distances may be calculated based on the following formula:

$$1/u+1/d=1/f,$$

where u is an object distance, d is an image distance, f is a focal length, and the image distance is a distance between an image plane of the imaging device and the liquid crystal lens.

According to some embodiments of the present disclosure, the method for measuring the speed may further include: obtaining images of the reference object; and storing the images of the reference object.

It should be noted that, for details not disclosed for the method for measuring the speed of the embodiments of the present disclosure, reference can be made to the details disclosed for the speed sensor of the embodiments of the present disclosure, which is not described in detail here.

According to the method for measuring the speed of the embodiments of the present disclosure, the voltages applied to the liquid crystal lens are controlled, the images of the reference object under the different voltages are obtained via the imaging device, digital processing is performed on the images of the reference object under the different voltages to generate digital information, it is determined, based on the digital information, that the first focus to the fourth focus are performed for the reference object by the liquid crystal lens, the first focus voltage to the fourth focus voltage are obtained based on the first focus to the fourth focus, and the acceleration is calculated based on the first focus voltage to the fourth focus voltage. In this way, during the movement of the measured object, the focus voltages corresponding to the multiple times of focus performed by the liquid crystal lens for the reference object in the moving direction of the measured object at different moments are obtained, so that the acceleration of the measured object can be calculated more accurately. Moreover, the manufacturing cost is relatively low, the functionality of the speed sensor is improved, range of the application scenarios is wider, and user experience is improved.

In addition, some embodiments of the present disclosure provide a computer readable storage medium on which a computer program is stored. When the program is executed by a processor, the method for measuring the speed as described above is implemented, and the same technical effects can be realized, which is not repeated herein. The computer readable storage medium may be a read-only memory (ROM), a random access memory (RAM), a magnetic disk, or an optical disk.

According to the computer readable storage medium according to the embodiments of the present disclosure, the method for measuring the speed as described above is performed. In this way, during the movement of the measured object, the focus voltages corresponding to the multiple times of focus performed by the liquid crystal lens for the reference object in the moving direction of the measured object at different moments are obtained, so that the speed or the acceleration of the measured object can be calculated more accurately. Moreover, the manufacturing cost is relatively low, the functionality of the speed sensor is improved, range of the application scenarios is wider, and user experience is improved.

It can be understood that the implementations described in the embodiments of the present disclosure may be implemented by hardware, software, firmware, middleware, microcode, or a combination thereof.

For hardware implementation, the processing unit may be implemented in one or more application specific integrated circuits (ASIC), digital signal processors (DSP), DSP devices (DSPD), programmable logic devices (PLD), field-programmable gate arrays (FPGA), general purpose processors, controllers, microcontrollers, microprocessors, other electronic units for performing the functions described in the present disclosure or a combination thereof.

For software implementation, the technologies described in the embodiments of the present disclosure may be implemented by performing the modules (such as procedures, functions, or the like) of the functions described in the embodiments of the present disclosure. Software codes may be stored in a memory and executed by a processor. The memory may be implemented in the processor or external to the processor.

In addition, in the description of the present disclosure, the orientations or positional relationships indicated by the terms such as "above", "below", "front" or "horizontal" are based on orientations or positional relationships shown in the drawings, which are merely for simplicity of description of the present disclosure and do not indicate or imply that the device or element as referred to should have a particular orientation, or should be constructed or operated in a particular orientation. Therefore, the terms should not be construed as limitation to the present disclosure.

In addition, the terms such as "first" and "second" are used for description purpose only and should not be understood as indicating or implying relative importance or implicitly indicating the number of the indicated technical features. Therefore, when a feature is defined with "first" or "second", at least one of the feature may be explicitly or implicitly included. In the description of the present disclosure, the term "multiple" represents at least two, such as two or three, unless otherwise defined.

In the present disclosure, terms such as "arranged" or "fixed" shall be understood in a broad sense unless otherwise specified and defined, for example, it may be fixed connection, detachable connection, or integrated; or, it may be mechanical connection or electrical connection; or, it may be direct connection or indirect connection through an intermediate medium or may be internal connection of two elements or the interaction relationship between two elements, unless otherwise defined. For those of ordinary skill in the art, the specific meanings of the above terms in the present disclosure can be understood based on specific situations.

In the present disclosure, unless otherwise explicitly stated and defined, a first feature being "above" or "below" a second feature may refer to the fact that the first feature and the second feature are in direct contact, or the first feature and the second feature are in indirectly contact through an intermediate medium. Moreover, the first feature being "higher than", "above" or "on" the second feature may refer to the fact that the first feature is directly above or obliquely above the second feature, or the level of the first feature is higher than that of the second feature. The first feature being "lower than", "below" or "under" the second feature may refer to the fact that the first feature is directly below or obliquely below the second feature, or the level of the first feature is lower than that of the second feature.

In the descriptions of the specification, the descriptions with reference to the terms such as "one embodiment", "some embodiments", "examples", "specific examples" or "some examples" means that specific features, structures, materials, or characteristics described in conjunction with the embodiments or examples are included in at least one embodiment or example of the present disclosure. In the specification, the schematic expressions of the above terms are not necessarily directed to the same embodiment or example. Furthermore, the specific features, structures, materials, or characteristics as described may be combined in any suitable manner in any one or more embodiments or examples. In addition, when there is no contradiction, those skilled in the art may combine different embodiments or examples, and features of the different embodiments or examples described in the specification.

The embodiments of the present disclosure are shown and described in the above, and it can be understood that the above embodiments are exemplary and should not be construed as limitation to the present disclosure. Changes, modifications, substitutions, and variants can be made to the above embodiments by those skilled in the art without departing from the scope of the present disclosure.

What is claimed is:
1. A speed sensor, comprising:
an imaging device;
a liquid crystal lens on a side of the imaging device; and a controller, configured to: apply different voltages to the liquid crystal lens, obtain, via the imaging device, images of a reference object formed through the liquid crystal lens under the different voltages, control, based on information of the images, the liquid crystal lens to realize focus for a plurality of times for the reference object, obtain a voltage that is correspondingly applied to the liquid crystal lens when each of the plurality of times of focus is realized, and calculate a speed based on the voltages.

2. The speed sensor according to claim 1, wherein controlling, based on the information of the images, the liquid crystal lens to realize focus for the plurality of times for the reference object comprises: controlling, based on the information of the images, the liquid crystal lens to realize first focus and second focus for the reference object; and wherein obtaining the voltage that is correspondingly applied to the liquid crystal lens when each of the plurality of times of focus is realized comprises: obtaining a first voltage that is applied to the liquid crystal lens when the first focus is realized and a second voltage that is applied to the liquid crystal lens when the second focus is realized.

3. The speed sensor according to claim 2, wherein the liquid crystal lens is configured to: perform the first focus and the second focus for the reference object at a start time of a first period and an end time of the first period respectively.

4. The speed sensor according to claim 3, wherein the controller is configured to:

obtain the first voltage and the second voltage of the liquid crystal lens respectively corresponding to the first focus and the second focus; and calculate the speed of the first period based on the first voltage and the second voltage.

5. The speed sensor according to claim 4, wherein calculating the speed of the first period based on the first voltage and the second voltage comprises:

obtaining a first focal length corresponding to the first focus and a second focal length corresponding to the second focus based on the first voltage and the second voltage;

calculating a first object distance corresponding to the first focus and a second object distance corresponding to the second focus based on the first focal length and the second focal length; and calculating the speed based on the first object distance, the second object distance, and the first period.

6. The speed sensor according to claim 5, wherein the controller is configured to:

determine the first focal length and the second focal length based on a mapping relation, between focal lengths and voltages, of the liquid crystal lens; and calculate the first object distance and the second object distance respectively corresponding to the first focal length and the second focal length based on the following formula:

$$1/u + 1/d = 1/f,$$

where u is an object distance, d is an image distance, f is a focal length, and the image distance is a distance between an image plane of the imaging device and the liquid crystal lens.

7. The speed sensor according to claim 3, wherein controlling, based on the information of the images, the liquid crystal lens to realize focus for the plurality of times for the reference object further comprises: controlling, based on the information of the images, the liquid crystal lens to realize third focus and fourth focus for the reference object;

wherein obtaining the voltage that is correspondingly applied to the liquid crystal lens when each of the plurality of times of focus is realized further comprises: obtaining a third voltage that is applied to the liquid crystal lens when the third focus is realized and a fourth voltage that is applied to the liquid crystal lens when the fourth focus is realized; and wherein the liquid crystal lens is further configured to: perform the third focus and the fourth focus for the reference object at a start time of a second period and an end time of the second period respectively.

8. The speed sensor according to claim 7, wherein the controller is configured to:

obtain the first voltage and the second voltage of the liquid crystal lens respectively corresponding to the first focus and the second focus, and obtain the third voltage and the fourth voltage of the liquid crystal lens respectively corresponding to the third focus and the fourth focus;

calculate a first average speed of the first period based on the first voltage and the second voltage, and calculate a second average speed of the second period based on the third voltage and the fourth voltage; and calculate an acceleration based on the first average speed and the second average speed.

9. The speed sensor according to claim 8, wherein calculating the first average speed of the first period based on the first voltage and the second voltage, and calculating the second average speed of the second period based on the third voltage and the fourth voltage comprises:

obtaining a first focal length corresponding to the first focus and a second focal length corresponding to the second focus based on the first voltage and the second voltage, and obtaining a third focal length corresponding to the third focus and a fourth focal length corresponding to the fourth focus based on the third voltage and the fourth voltage;

calculating a first object distance corresponding to the first focus and a second object distance corresponding to the second focus based on the first focal length and the second focal length, and calculating a third object distance corresponding to the third focus and a fourth object distance corresponding to the fourth focus based on the third focal length and the fourth focal length; and calculating the first average speed based on the first object distance, the second object distance, and the first period, and calculating the second average speed based on the third object distance, the fourth object distance, and the second period.

10. The speed sensor according to claim 9, wherein the controller is configured to:

determine the first focal length to the fourth focal length based on a mapping relation, between focal lengths and voltages, of the liquid crystal lens; and calculate the first object distance to the fourth object distance respectively corresponding to the first focal length to the fourth focal length based on the following formula:

$$1/u + 1/d = 1/f,$$

where u is an object distance, d is an image distance, f is a focal length, and the image distance is a distance between an image plane of the imaging device and the liquid crystal lens.

11. The speed sensor according to claim 1, further comprising a memory, configured to store images of the reference object.

12. A device for measuring a speed, comprising:
a main body; and
a plurality of speed sensors according to claim 1, wherein the plurality of speed sensors is on the main body and is configured to detect speeds of a measured object in a plurality of directions.

13. A method for measuring a speed, applied to a speed sensor, wherein the speed sensor comprises an imaging device and a liquid crystal lens, the liquid crystal lens is on a side of the imaging device, and the method comprises:
applying different voltages to the liquid crystal lens, and obtaining, via the imaging device, images of a reference object formed through the liquid crystal lens under the different voltages;
controlling, based on information of the images, the liquid crystal lens to realize focus for a plurality of times for the reference object; and
obtaining a voltage that is correspondingly applied to the liquid crystal lens when each of the plurality of times of focus is realized, and calculating a speed based on the voltages.

14. The method for measuring the speed according to claim 13, wherein controlling, based on the information of the images, the liquid crystal lens to realize focus for the plurality of times for the reference object comprises: controlling, based on the information of the images, the liquid crystal lens to realize first focus and second focus for the reference object; and
wherein obtaining the voltage that is correspondingly applied to the liquid crystal lens when each of the plurality of times of focus is realized comprises: obtaining a first voltage that is applied to the liquid crystal lens when the first focus is realized and a second voltage that is applied to the liquid crystal lens when the second focus is realized.

15. The method for measuring the speed according to claim 14, wherein controlling the liquid crystal lens to realize the first focus and the second focus for the reference object comprises:
performing the first focus and the second focus for the reference object at a start time of a first period and an end time of the first period respectively.

16. The method for measuring the speed according to claim 15, wherein calculating the speed based on the voltages comprises: calculating the speed of the first period based on the first voltage and the second voltage; and
wherein calculating the speed of the first period based on the first voltage and the second voltage comprises: obtaining a first focal length corresponding to the first focus and a second focal length corresponding to the second focus based on the first voltage and the second voltage; calculating a first object distance corresponding to the first focus and a second object distance corresponding to the second focus based on the first focal length and the second focal length; and calculating the speed based on the first object distance, the second object distance, and the first period.

17. The method for measuring the speed according to claim 16, wherein the first focal length and the second focal length are determined based on a mapping relation, between focal lengths and voltages, of the liquid crystal lens; and wherein the first object distance and the second object distance respectively corresponding to the first focal length and the second focal length are calculated based on the following formula:

$$1/u+1/d=1/f,$$

where u is an object distance, d is an image distance, f is a focal length, and the image distance is a distance between an image plane of the imaging device and the liquid crystal lens.

18. The method for measuring the speed according to claim 15, wherein controlling, based on the information of the images, the liquid crystal lens to realize focus for the plurality of times for the reference object further comprises: controlling, based on the information of the images, the liquid crystal lens to perform third focus and fourth focus for the reference object at a start time of a second period and at an end time of the second period respectively;
wherein obtaining the voltage that is correspondingly applied to the liquid crystal lens when each of the plurality of times of focus is realized further comprises: obtaining a third voltage that is applied to the liquid crystal lens when the third focus is realized and a fourth voltage that is applied to the liquid crystal lens when the fourth focus is realized; and
wherein calculating the speed based on the voltages comprises: calculating a first average speed of the first period based on the first voltage and the second voltage, calculating a second average speed of the second period based on the third voltage and the fourth voltage, and calculating an acceleration based on the first average speed and the second average speed.

19. The method for measuring the speed according to claim 18, wherein calculating the first average speed of the first period based on the first voltage and the second voltage, and calculating the second average speed of the second period based on the third voltage and the fourth voltage comprises:
obtaining a first focal length corresponding to the first focus and a second focal length corresponding to the second focus based on the first voltage and the second voltage, and obtaining a third focal length corresponding to the third focus and a fourth focal length corresponding to the fourth focus based on the third voltage and the fourth voltage;
calculating a first object distance corresponding to the first focus and a second object distance corresponding to the second focus based on the first focal length and the second focal length, and calculating a third object distance corresponding to the third focus and a fourth object distance corresponding to the fourth focus based on the third focal length and the fourth focal length; and
calculating the first average speed based on the first object distance, the second object distance, and the first period, and calculating the second average speed based on the third object distance, the fourth object distance, and the second period;
wherein the first focal length to the fourth focal length are determined based on a mapping relation, between focal lengths and voltages, of the liquid crystal lens; and
wherein the first object distance to the fourth object distance respectively corresponding to the first focal length to the fourth focal length are calculated based on the following formula:

$$1/u+1/d=1/f,$$

where u is an object distance, d is an image distance, f is a focal length, and the image distance is a distance between an image plane of the imaging device and the liquid crystal lens.

20. A computer readable storage medium, having a program stored thereon, wherein, when the program is executed by a processor, the following steps are implemented:
  applying different voltages to a liquid crystal lens, and obtaining, via an imaging device, images of a reference object formed through the liquid crystal lens under the different voltages;
  controlling, based on information of the images, the liquid crystal lens to realize focus for a plurality of times for the reference object; and
  obtaining a voltage that is correspondingly applied to the liquid crystal lens when each of the plurality of times of focus is realized, and calculating a speed based on the voltages.

* * * * *